Oct. 28, 1969     A. I. M. KEULEMANS     3,475,131
PYROLYSIS APPARATUS

Filed Sept. 9, 1965     2 Sheets—Sheet 1

A. I. M. KEULEMANS
Inventor

By *Daniel D. Levinson*
Attorney

# United States Patent Office 3,475,131
Patented Oct. 28, 1969

3,475,131
PYROLYSIS APPARATUS
Aloysius I. M. Keulemans, Eindhoven, Netherlands, assignor to Perkin-Elmer Limited, Beaconsfield, Buckinghamshire, England, a British company
Filed Sept. 9, 1965, Ser. No. 486,068
Claims priority, application Great Britain, Sept. 11, 1964, 37,312/64
Int. Cl. G01n 31/00
U.S. Cl. 23—253    6 Claims

ABSTRACT OF THE DISCLOSURE

A pyrolyzer for forming more easily analyzed reaction products of an original chemical sample includes a long narrow tube, of at least 50:1 length to width ratio. The interior of the tube is lined with gold, silver or copper, and placed within a heated enclosure, the temperature of which may be varied over the range from 200 to 800° C. The tube may be, for example, of circular cross section having an internal diameter of 1 mm. and an overall length of 50 cm. (500 mm.) which is preferably formed into a compact coil. The enclosure preferably includes a central core of for example silver and a thermally insulating outer casing. The sample substances to be pyrolyzed are first vaporized and then "flushed" through the reactor tube by means of an inert gas (for example. pure nitrogen). The reaction products may be subsequently analyzed, for example by means of a capillary tube gas chromatograph.

---

In thermolysis, sometimes known as pyrolysis, substances are heated under carefully controlled conditions of time, temperature, and environment in a reactor, known as a pyrolyzer, and reaction products, known as pyrolyzates, are produced by the decomposition of the substances and the subsequent complex interactions of the free radicals with one another and with the original substances. The reaction products are usually analyzed, for example by means of a gas chromatograph, and the results of the analysis are useful, for example, to obtain quantitative assessments of bond energies and activation energies or to recognize the structure of the original substances by comparing the results with the standard results of pyrolyzing known substances. The thermolysis may be run in conjunction with an industrial process to provide periodic checks on the specific compositions of the reactants and products of the process. The pyrolyzates are usually extremely complex and may be unstable and the conditions under which the reactions take place are critical. These conditions must be accurately reproducible if an experiment is to be repeated in the same or a different laboratory or compared with a standard.

One type of conventional reactor for conducting thermolysis consists of a closed vessel in which the substances are heated at relatively low pressure, the volume of the vessel being as large as possible to reduce surface effects. Another type of reactor includes an electrically heated wire on which the substances to be heated are deposited as a thin skin. These reactors however suffer from the serious disadvantage that the reproducibility of an experiment cannot be relied upon sufficiently accurately.

In accordance with the present invention a method of conducting thermolysis comprises passing the substances to be decomposed in a steady stream through a passageway having a length at least fifty times its width while the walls of the passageway are accurately heated.

I find that this method is simple and extremely efficient in that all parts of the sample passing through the passageway see the same environment and are subject to the same controlled conditions in the passageway for the same time. The passageway can be considered in terms of the theoretical plate concept. Each section of the passageway, having a length approximately equal to the width of the passageway, approximates to a plate, or ideal mixer, in which the reacting species are substantially in the same condition with substantially no intermixing between the species in different plates. The length to width ratio of 50 to 1 is a minimum acceptable ratio for satisfactory and even heat transference from the walls of the passageway to the substances passing along the passageway if end defects are to be considered negligible. In a typical reaction, the stream of the substances to be decomposed which is passed through the passageway is approximately twice the length of the passageway.

Except in a few cases in which the equilibrium of the thermal decomposition and subsequent reactions goes to completion in one direction in the presence of only a small amount of a catalyst, the walls of the passageway should be inert to the substances undergoing the reaction in the passageway and should exert no catalytic influence. Since many reactions which occur during thermolysis are extremely susceptible to catalytic action, the danger of the walls of the passageway exerting a catalytic influence is that they may, during the reaction, become slightly poisoned so that reacting species in the front of the stream passing through the passageway would see a different environment to that seen by the species at the rear of the stream. In practice, I find that it is preferable if the walls of the passageway are made of silver, copper, but best of all gold.

The substance which are to be subjected to the thermolysis are preferably passed along the passageway in the vapor state mixed with an inert carrier gas which may be used to sweep the reaction products into a gas chromatograph situated at the downstream end of the passageway, for analysis. A vaporizing chamber may be provided at the upstream end of the passageway so that the sample can be injected as a liquid into the vaporizing chamber before passing into the passageway in the vapor state. When carrier gas is used, its flow rate should preferably be able to be regulated to ensure accurately reproducible thermolysis times. This is also of value in achieving reproducible retention times in the gas chromatograph when one is used.

The mehod is particularly applicable to first order reactions such as the gas phase decomposition of volatile organic substances. For example, one use of the method is in conjunction with the industrial manufacture of detergents. Detergences are commonly made from olefines which should be straight-chained if the resulting detergents are to be biodegradable. The use of thermolysis in conjunction with a gas chromatograph for analysis, enables straight-chained olefines to be differentiated from branch-chained olefines, a thing which cannot be done with other equipment such as mass spectographs which can only be used for measuring mass numbers.

The sample to be subjected to the thermolysis, may, if desired, be mixed with another substance either to aid the subsequent analysis or to obtain different reactions in the reactor. An example of the former use is to add benzene, which is relatively inert with thermolizing aliphatic hydrocarbons, and use it as an internal standard for determining the exact quantity of the sample injected. An example of the latter use is to add an excess of toluene, which readily reacts with most free radicals to form a stable compound and relatively inert benzyl radical, thereby simplifying the reactions.

The present invention also includes a reactor for use in carrying out the method according to the main feature of the invention, the reactor comprising a steady temperature enclosure having a heater for controlling its temperature accurately, and a passageway having a length at least 50 times its mean width formed within the enclosure and arranged so that a stream of substances to be subjected to thermolysis can be passed through it in a steady stream, the walls of the passageway being formed or lined with gold, silver or copper.

In order to be useful for several different reactions, the temperature of the enclosure, and hence of the walls of the passageway, should be variable at least over the range of from 200 to 800° C. Provided that the minimum ratio of 50 to 1 is exceeded, the actual dimensions of the passageway are not critical and a typical passageway is of constant circular cross section 1 mm. diameter and 50 cm. long, giving a length to diameter ratio of 500 to 1.

The cross section of the passageway need not be constant although it should not change abruptly and should be of substantially constant area along its full length so that the different parts of the stream passing along he passageway move with the same velocity.

It is not necessary for the passageway to be straight and, in order to provide a compact arrangement, and a reasonably sized steady temperature enclosure, it may be formed by the bore of a helical tube which is embedded in the enclosure medium and is formed or lined by any of the three acceptable metals. The enclosure may be a silver block containing an electrical heating coil and surrounded by insulating material in an outer casing. The silver is an excellent thermal conductor and enables a large amount of thermal energy to be imparted to and through the walls of the tube. As explained, a gas chromatograph may be provided directly at the downstream end of the passageway for analyzing purposes and a vaporizing chamber may be provided immediately adjacent to the upstream end of passageway in order to vaporize substances to be decomposed.

One example of a reactor constructed in accordance with the present invention and a circuit diagram including the reactor are illustrated in the accompanying drawings in which.

Figure 1:
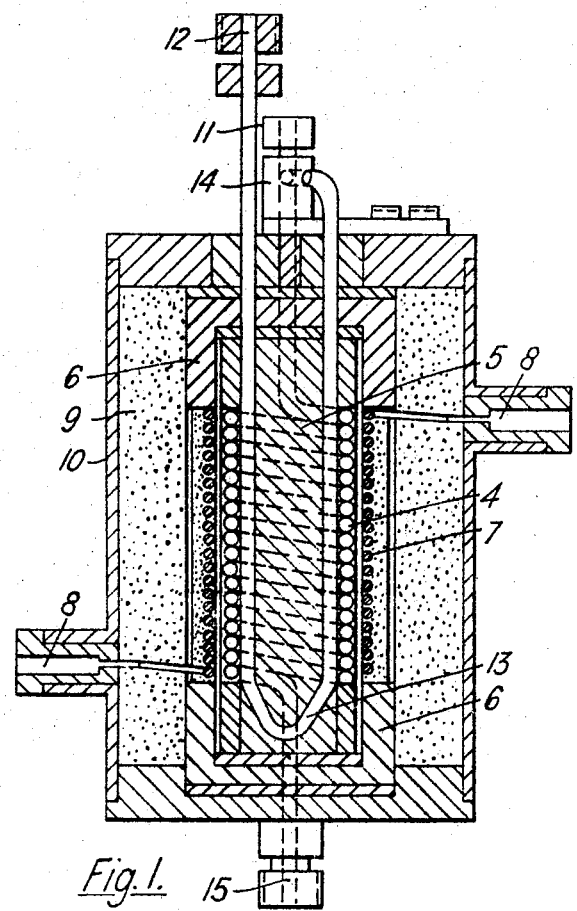
FIGURE 1 is a central vertical section through the reactor.
Figure 2:
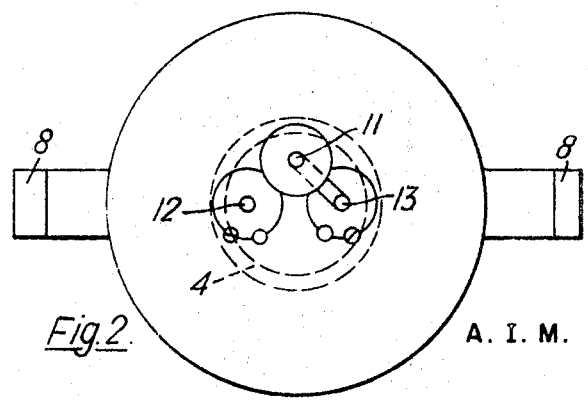
FIGURE 2 is a plan of the reactor.

As shown in FIGURES 1 and 2 the reactor consists of a closely helically coiled gold tube 4 of constant circular cross section, 50 cm. long, and with an internal diameter of 1 mm. The tube 4 is wound around a silver core 5, fited with silver end caps 6, and is surrounded by a nickel-chromium electrical heating coil 7 which is connected to terminals 8. All these parts are surrounded with thermally insulating diatomacious earth 9 enclosed in a brass casing 10. The reactor temperature is measured in the center of the core 5 with a thermocouple and a 500° C. variations in temperature over the length of the core 5, and therefore over the lenght of the tube 4, could not be observed indicating that any variations must be less than 1° C. The temperature control is provided by supplying the heating current from a voltage stablizer.

In use substances to be subjected to thermolysis are vaporized in a vaporizing chamber and fed under pressure into an inlet 11 of the reactor. An inert gas is injected into an inlet 12 and passes through a preheating tube 13 before entering the upstream end 14 of the tube 4 where it carries the injected substances to be subjected to thermolysis down into the reactor, around the coils of the tube 4, and out through an outlet 15.

Figure 3:
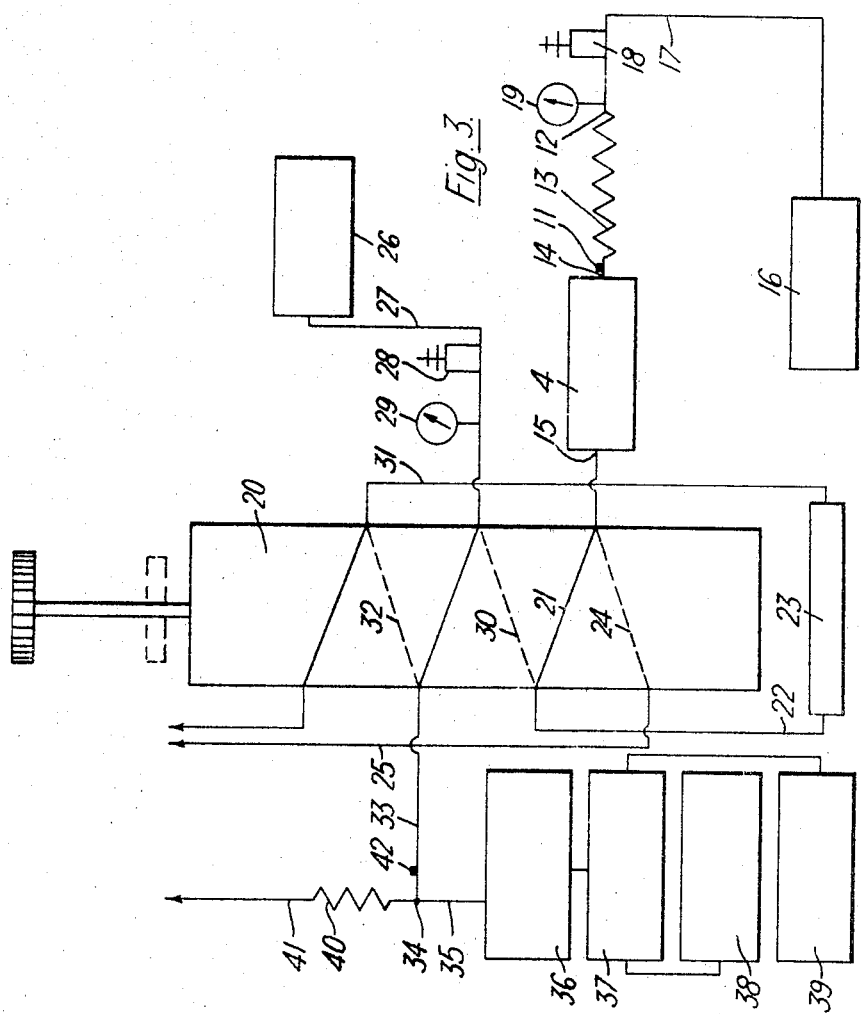
FIGURE 3 is the circuit diagram.

FIGURE 3 shows the circuit for studying the cracking of cyclopropane into propylene using the reactor. Oxygen free nitrogen forming an inert carrier gas is supplied from a source 16 and passes through the inlet 12 of the reactor along a line 17 at a pressure which is controlled by a valve 18 and measured by a gauge 19. After preheating in the capillary loop 13, the inert carrier gas collects at the inlet 14 the sample of cyclopropane which has been injected into the inlet 11. A 0.1. µl. volume of liquid cyclopropane is used with a small but known proportion of benzene. The vaporization of the cyclopropane before injection forms a gas with a volume of less than 100µl at the reaction temperature of approximately 500° C. The benzene is used as a marker and from numerous experiments with and without benzene it is concluded that it has no effect upon the decomposition rates of the cyclopropane. The benzene is highly refractory and is not decomposed under conditions where most other hydrocarbons crack appreciably. The benzene peak is a measure of the initial concentration of cyclopropane and conversions are measured with respect to the benzene peak.

The gases, including the plug of cylopropane, flow through the gold tube 4 of the reactor at a velocity of the order of 100 mm./sec. in a particular experiment, flow rates were changed to give reaction times within the range 10 to 60 seconds and the reaction temperature took a number of different values close to 500° C. and measured by the thermocouple. The gas flow rates in the reactor tube 4 are measured with the aid of a soap film flow meter and reaction times are calculated from this flow rate and the reactor volume which is about 0.7 ml. The gold tube exerts no appreciable catalytic influence on the thermolysis reactions.

After passing through the reactor tube 4 in a steady stream where thermolysis at a controlled temperature takes place the gaseous pyrolyzates including a proportion of propylene leave the outlet 15 and, with an electromagnetic seven-port, two-position spool valve 20 (greatly magnified in FIGURE 3 in relation to the other components) in its full line position, through port 21 and line 22 into a sample storage volume 23 where 1 ml. of the gas is trapped. After a predetermined retention time, the valve 20 is automatically changed over to its dotted line position. The reaction tube 4 is then vented to atmosphere through a port 24 and a vent line 25.

Further oxygen free nitrogen forming an inert gas is then supplied from a source 26 along a line 27 at a pressure controlled by a valve 28 and measured by a gauge 29 through a port 30, and hence through the line 22 and sweeps the 1 ml. pyrolyzate sample out of the storage volume 23. The sample is swept along a line 31, through a port 32 and along a line 33 to a junction 34 where 0.5% of the sample passes along a line 35 for analysis to a capillary tube chromatograph 36 having a capillary column of 30 meter length and 0.25 mm. diameter and containing hexadecene-1 as the column liquid. Areas on the chromatogram are measured with the aid of a flame detector 37 to which are connected a recorder 38 and an integrator 39. The rest of the sample passes from the system out through a restriction 40 to a vent 41.

If the pyrolyzates are to be compared with known substances, the known substances are injected through an inlet 42 from where part passes directly to the chromatograph 36.

The reactor may be used to determine the pyrolyzates resulting from thermolysis of known substances or to identify complex substances subjected to thermolysis by recognizing the pyrolyzates. This latter use is particularly important in conjunction with industrial processes when the prompt identification of small quantities of complex substances taken from a manufacturing plant is required.

Other uses of the reactor are for determining physiochemical constants of substances, such as the rate constant for a reaction or its activation energy. Thus in a typical first order reaction, such as the cracking of cyclopropane, the relation exists:

$$-\log \frac{C}{C_0} = kt$$

where $C_0$ is the initial concentration of one of the substances, $C$ is the final concentration of one of the substances, $k$ is the rate constant, and $t$ is the reaction time.

From measurements of values of $k$ at different temperatures, the activation energy can be calculated from Arrhenius' equation or obtained from a simple graph.

The reactor can be used as a continuous through flow reactor in which case $C_0$ and $C$ have readily measured values but this is un economical in the volume of sample which must be available. For this reason pulse operation, as described above in connection with the cracking of cyclopropane, has advantages. All parts of the sample plug see the same environment as they pass through the reactor tube 4 but because the sample plug is entrained in a carrier gas the concentration at the reactor inlet 14 will not in general be equal for all portions of the plug. Nevertheless, the ratio of $C/C_0$ will apply to all portions of the plug so that determination of the rate constant will not depend upon $C_0$ at all. Provided therefore that the reactor tube 4 is sufficiently long compared to its width, there will be sufficient theoretical plates along the tube for the results of the first order gas reactions obtained from pulse injection to be the same as those from continuous flow. Reaction rates can therefore be measured with the reactor using only submilligram quantities of the sample material and in fact the amount of material required is determined only by the sensitivity of the method of analysis.

I claim:
1. A thermolysis reactor for pyrolyzing a sample substance in a reproducible manner for analytical purposes, comprising:
   a long, narrow hollow reactor tube, having a length at least 50 times its internal diameter;
   enclosure means substantially surrounding said reactor tube;
   means for accurately controlling the temperature within said enclosure at any particular desired temperature within the range of 200° C. to 800° C.;
   and means for introducing to the inlet end of said reactor tube a mixture of said sample substance in vaporized form and an inert carrier gas;
   the interior walls of said reactor tube being composed of a catalytically inert metal chosen from the group consisting of gold, silver and copper;
   whereby a steady stream of said vaporized sample substance passes through said evenly heated inert long reactor tube, so as to undergo even reproducible pyrolysis under substantially the same conditions in all parts of its passage through said long inert reactor tube.
2. A reactor according to claim 1, in which:
   said long reactor tube is in the form of a helical coil, at least partially embedded in the material comprising parts of said enclosure means.
3. A reactor according to claim 1, in which:
   said enclosure means comprises a central silver block, a heater coil and surrounding insulating material.
4. A reactor according to claim 3, in which:
   said long reactor tube is in the form of a helical coil which substantially surrounds said central silver block and in turn is substantially surrounded by said heater coil and said insulating material;
   whereby all of said reactor tube is maintained at the same particular desired temperature.
5. A reactor according to claim 1, in which:
   the outlet end of said reactor tube is provided with means for collecting the pyrolyzates, for further analysis thereof.
6. A reactor according to claim 5, in which:
   valve means are provided for optionally first causing collection of said pyrolyzates in said collecting means and then causing said inert carrier gas to sweep said pyrolyzates from said collecting means into a subsequent analysis instrument.

References Cited

UNITED STATES PATENTS

| | | | |
|---|---|---|---|
| 2,393,778 | 1/1946 | Hull | 260—585.5 |
| 2,542,762 | 2/1951 | Forbes. | |
| 3,318,667 | 5/1967 | Fabuss et al. | |

OTHER REFERENCES

Mellor, Comprehensive Treatise on Inorganic and Theoretical Chemistry, vol. 3, pp. 525–527 (1923).

MORRIS O. WOLK, Primary Examiner

ELLIOTT A. KATZ, Assistant Examiner

U.S. Cl. X.R.

23—230, 232, 254